United States Patent [19]
Leitner et al.

[11] Patent Number: 6,047,496
[45] Date of Patent: *Apr. 11, 2000

[54] STRUCTURAL FUMIGATION PROCESS AND APPARATUS

[76] Inventors: Kenneth D. Leitner, 6382 Schubert St., Buena Park, Calif. 90620; Arthur W. R. Terry, 9732 Compton Blvd., Bellflower, Calif. 90706

[ * ] Notice: This patent is subject to a terminal disclaimer.

[21] Appl. No.: 08/553,458

[22] Filed: Mar. 20, 1996

[51] Int. Cl.[7] .................................................. A01M 13/00
[52] U.S. Cl. .......................................................... 43/125
[58] Field of Search ............................... 43/124, 125, 58; 422/32

[56] References Cited

U.S. PATENT DOCUMENTS

| | | | |
|---|---|---|---|
| 1,861,736 | 6/1932 | Bersie | 43/125 |
| 4,200,656 | 4/1980 | Cohen | 422/32 |
| 5,063,706 | 11/1991 | Aki et al. | 43/125 |

FOREIGN PATENT DOCUMENTS 1191046  11/1985  U.S.S.R. .................. 43/124

*Primary Examiner*—Kurt Rowan

[57] ABSTRACT

Processes and devices for producing a heated non-flammable gaseous fumigant for structural fumigation use by the application of a carrier gas, such as carbon dioxide (102), to a heater (103) either prior or subsequent to mixing the gas with a toxic agent gas, such as methyl bromide (213), such as by means of a mixer (214) and applying the mixture of gasses as a structural fumigant to eradicate target pests within a structure (106). In the preferred embodiment, the gaseous carbon dioxide is formed by flashing liquid carbon dioxide (614) directly to the gaseous state in a heater (630) prior to being mixed with methyl bromide (654) in a mixer (648) and applying the mixture of gasses as a structural fumigant within a structure (668).

12 Claims, 2 Drawing Sheets

STRUCTURAL FUMIGATION PROCESS AND APPARATUS

BACKGROUND OF THE INVENTION

1. TECHNICAL FIELD

This invention relates generally to fumigation processes for structural fumigation utilizing substantially reduced concentrations of toxic agent so as to be less hazardous during application and result in substantially less hazardous quantities of residue at the completion of the process, and more particularly, to the use of carbon dioxide as an agent to carry, disperse and increase the effect of a toxic agent such as methyl bromide, to be used to eradicate pests located in the structure to be fumigated.

2. BACKGROUND ART

Conventional structural fumigation processes have required high concentrations of a toxic agent in order to achieve effective levels of eradication of a target pest infesting the structure. If the toxic agent is methyl bromide, the present practice of using at least three pounds of the agent per one thousand cubic feet of volume in order to achieve an effective concentration of the methyl bromide. However, by reason of currently effective United States statutes and treaties, the quantity of methyl bromide used in fumigants must be reduced by one-half by the year 2000. The conventional structural fumigation processes by the use of methyl bromide alone do not provide for satisfactory kill rates for the target pests at the reduced concentrations to be required for environmental reasons. In this respect, tests by environmental agencies have found that use of methyl bromide at such conventional concentrations has the potential to result in toxic residues within protected areas which remain at a level above five parts per million in air samples after the process is completed. This level of residual toxic agent constitutes an unacceptable risk to the persons applying the fumigant as well as residents of structures and workers entering the fumigated area after the process has been completed.

Toxic agents other than methyl bromide have been used in fumigation processes. The levels of certain other toxic agents required to achieve the similar toxicity effects also often result in currently unacceptable levels of toxic residue, so as to require long aeration periods after the process has been completed in order to disperse the fumigant into the atmosphere.

Typical of the attempts to solve the problem of residual toxicity in commodities being fumigated have attempted to use carbon dioxide to control insects in stored grain. This method, set forth in U.S. Department of Agriculture bulletin AAT-S-13/April 1980, requires a carbon dioxide concentration of about 60% to achieve 95% control of most stored grain insects after a four day exposure at temperatures of twenty-seven degrees Celsius or higher. An alternate method of using a low oxygen/nitrogen atmosphere must be held for ten or more days. Neither of these methods is acceptable for structural fumigation.

U.S. Pat. No. 4,989,363 discloses a process for protecting stored commodities in substantially a gasfilled enclosure of a pesticidal atmosphere comprising 60–100% carbon dioxide, which is impractical for structural fumigation.

U. S. Pat. Nos. 4,651,263 and 4,756,117 have attempted to solve the problem. They teach that bulk commodities such as grain infested by pests may be fumigated with phosphine gas. However, at low concentrations, the gas must be maintained three to four weeks, which is unacceptable for structural fumigation. The time may be shortened if the atmosphere is enriched with up to 30% carbon dioxide. However, the temperature of this process is critical as phosphine gas is explosive. Therefore, raising the temperature of the fumigant gas to decrease the concentration of the fumigant gas by weight is not practical for safety reasons in structural fumigation.

Thus there has long been a need for a structural fumigation process which may utilize toxic agents at lower levels of concentration than presently used in the art while providing a completed fumigation process in a shorter time than has been possible heretofore.

It is desired that at the end of this process the residual levels of toxic agent be significantly reduced to lower, safer toxic limits so that the structure treated may be aerated and available for use earlier than heretofore practical without unacceptable residual levels of toxic agents which would otherwise result in an unacceptable health hazard.

It is further desired that the process itself be environmentally safer than those process presently used in the art. It is further desired that the gasses used be non-volatile so that they may be heated to allow the gasses to expand to fill the volume being treated thereby reducing the weight of fumigant acquired by the process to be ultimately released into the atmosphere.

DISCLOSURE OF INVENTION

Accordingly, it is an object of the present invention to provide an improved structural fumigation process which reduces the amount of toxic agent by at least a factor of from about one-half to about one-sixth while not extending the current fumigant exposure times.

It is another object of this invention to provide a structural fumigation process with a shorter treatment time along with reduced toxic residuals in commodities.

It is another object to achieve reduced potential toxic residue in the structure from the fumigation process to levels recommended by environmental agencies.

It is yet another object to provide a structural fumigation process which does not pose a danger from auto-ignition of the gasses used.

It is yet another object to provide a structural fumigation process which significantly reduces the environmental impact of the process as compared to those presently used in the art.

The above and other objects of the present invention are achieved, according to a preferred embodiment thereof, by providing an improved structural fumigation process of using a non-flammable liquid cryogenic material which is vaporized to function as a carrier for the toxic agent. Carbon dioxide is presently preferred, although nitrogen or other non-flammable cryogenic liquids may be utilized to advantage with respect to conventional practice. The utilization of carbon dioxide gas as a carrier has been found to effect the desired kill rate with lower levels of toxic agent. Concentrations by weight of carbon dioxide and toxic agent are further reduced by including the step of heating the carbon dioxide gas before releasing the carbon dioxide into the structure to be treated. The heating expands the carbon dioxide and, therefore, the toxic agent when mixed with the carbon dioxide, to provide a driving force for the fumigant, providing effective fumigation of the structure with less gas and shorter time of application periods.

In a preferred embodiment, the application of a gas mixture utilizing a toxic agent such as methyl bromide with carbon dioxide in the gaseous state to the structure to be fumigated allows the quantity by weight of methyl bromide to be reduced substantially from the amount otherwise required in conventional fumigation treatments. Concentrations by weight of less than fifteen percent of carbon dioxide gas in the volume being treated allow effective fumigation results to be achieved.

While the carbon dioxide may be mixed with a toxic agent and injected into a gas cylinder to be utilized at the fumigation site, in the preferred embodiment an apparatus including a container of liquid carbon dioxide at a relatively low pressure and a toxic gas cylinder at an even lower pressure with appropriate controls, a heater for flashing liquid carbon dioxide directly into gaseous carbon dioxide, and a mixing chamber for mixing heated carbon dioxide with the toxic agent are utilized to provide a heated gaseous fumigant. The liquid carbon dioxide is heated as it passes through the heater to "flash" directly into the gaseous state as its pressure decreases, rather than passing into the solid state and subsequently evaporating, as has been the practice heretofore. The heated gaseous carbon dioxide is then mixed with the toxic agent, as for example by aspirating the toxic agent into the stream of heated gaseous carbon dioxide by means of a mixer disposed between the heater and the fumigation site. Controls are provided in the liquid carbon dioxide flow line and the toxic agent flow line to insure that the reduced concentration of the toxic agent in the fumigant gaseous mixture is achieved.

The heated gaseous carbon dioxide used in the process causes the combined gaseous mixture of carbon dioxide and toxic agent, that is, the gaseous fumigant, to continue to expand after entering the structure to be fumigated, thereby further reducing the quantity of toxic agent required and assisting in dispersing the fumigant to eradicate the target pest by driving the toxic agent into the walls and frame members of the structure to be fumigated, rather than relying on the greater weight of the fumigant with respect to air to displace air in the fumigation process, as has been the practice heretofore.

BRIEF DESCRIPTION OF DRAWINGS

The above and other embodiments of the present invention may be more fully understood from the following detailed description, taken together with the accompanying drawing, wherein similar reference characters refer to similar elements throughout, and in which.

MODES FOR CARRYING OUT THE INVENTION

Figure 1:
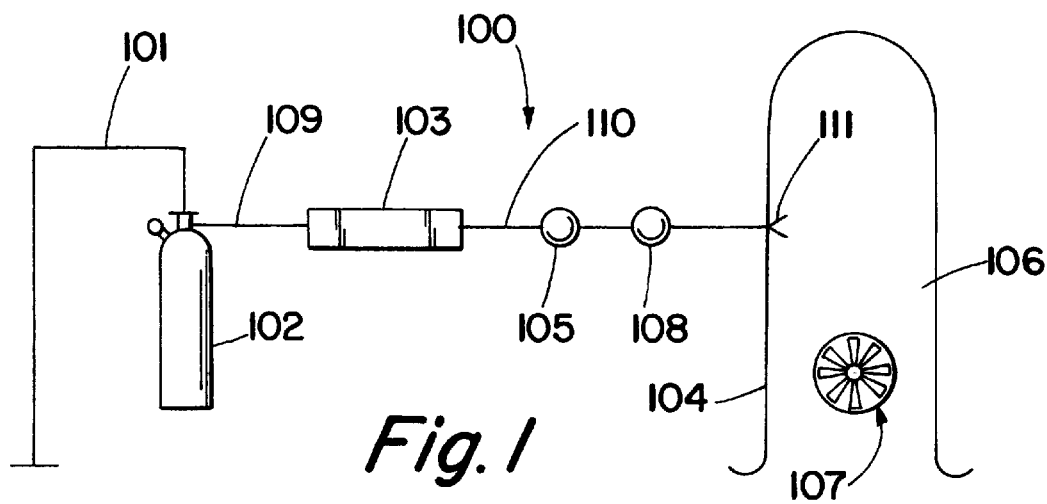
FIG. 1 is a schematic view of the apparatus of the present invention showing the flow of fumigant gas derived from sources of gaseous carbon dioxide and a toxic agent held in conventional high pressure cylinders.
Figure 2:
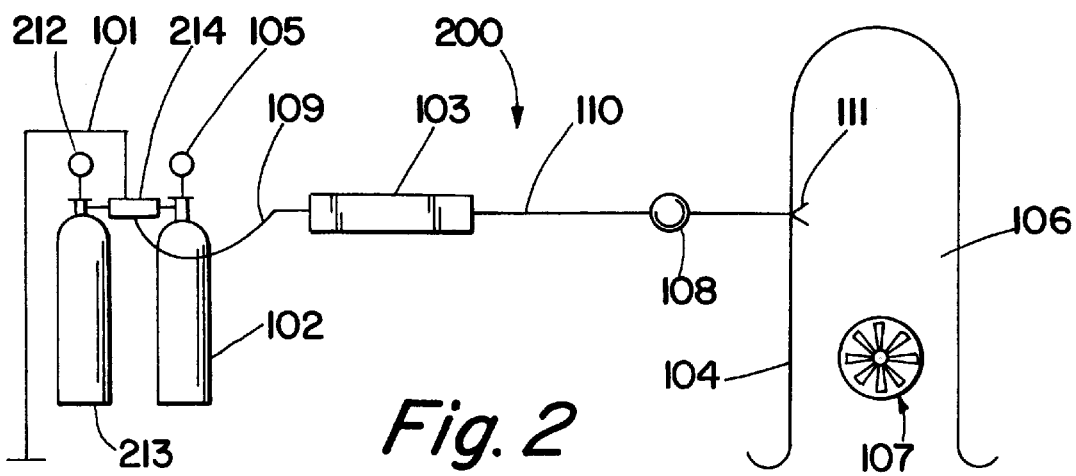
FIG. 2 is a schematic view which represents a control circuit for the apparatus of FIG. 1.

Fumigation of a physical structure in accordance with the method of FIGS. 1 and 2 may be performed by injecting a gaseous mixture of predetermined amounts of carbon dioxide and a preselected toxic agent into an enclosed structure. The enclosing of a structure is well known in the fumigation art and is commonly referred to as "tenting." The structure may be covered with tarpaulins which are folded and clipped at the edges and the free edges held against the structure or the ground by weights.

A cylinder of compressed gaseous carbon dioxide at room temperature has injected therein a toxic agent, such as methyl bromide, in the range of 8 ounces to 24 ounces per 11 pounds of carbon dioxide. The mixture of carbon dioxide and toxic agent is injected into the structure in an amount in the range of from as little as 8 pounds per 1000 cubic feet (approximately an 8% carbon dioxide concentration in the structural volume) for toxic agent amounts up to as much as 24 ounces to 22 pounds per 1000 cubic feet (approximately a 20% carbon dioxide concentration in the structural volume) for toxic agent amounts to as low as 4 ounces. A control test of carbon dioxide gas alone at 25% concentration (27.5 lbs/1000 ft$^3$) required forty-eight hours of exposure to attain acceptable fumigation results. However, carbon dioxide at an initial 10% concentration with toxic agent concentrations as low as 2% of the fumigant in the carbon dioxide achieved acceptable fumigation results within 24 hours of exposure time.

The preferred mixture of 8 ounces of toxic agent with 11 pounds of carbon dioxide injected per 1000 cubic feet of structure volume results in a toxic agent concentration of about 4% in the fumigant mixture, and a carbon dioxide concentration of about 10% of the fumigant —air mixture.

It has been found that by passing the fumigant. Through a heat exchanger before being injected into the structure for mixing with the air contained therein, the fumigation results are enhanced. The heating of the gaseous fumigant apparently produces two improved results. The first appears to be to reduce the amount of the fumigant required to treat the enclosed volume because heating causes the fumigant to expand. Second, because carbon dioxide is heavier than air, it normally accumulates in the low areas of the structure. The increased temperature of the fumigant causes the carbon dioxide to rise and mix with the air instead of layering on the structure floor. As the vapor pressure of carbon dioxide and the toxic agent are different, the heating also encourages the mixture of the gases forming the fumigant to stay together, thus achieving the desired synergistic effect of increased respiration rate in the target pest due to the increased carbon dioxide concentration while the toxic agent of the mixture being respirated produces a toxic effect upon the target pest. Of course, fans may be used to assure continued circulation of the fumigant within the structure after initial injection, as the heated mixture cools.

Various toxic agents may be mixed with the carbon dioxide. Combinations of toxic agents may be found to produce acceptable fumigation results with even lower total concentrations of toxic agent than are achieved by the use of a single toxic agent. The toxic agents commonly used for structural fumigation are methyl bromide, VIKANE (a trademark for sulfuryl fluoride), and sulfur dioxide. Heretofore, the preferred toxic agents have been methyl bromide and VIKANE. Methyl bromide has been widely used in the structural fumigation industry but is currently under review by environmental and occupational safety agencies for withdrawal from the market due to adverse reactions to concentrations of residues which accumulate in treated conventionally structures. However, by virtue of the reduced concentrations of methyl bromide resulting from the practice of the present invention, methyl bromide again is an acceptable component of a fumigant with respect to safety and environmental considerations.

VIKANE is presented by the manufacturer to the fumigation industry as an alternative to methyl bromide but has increased the cost of toxic agent significantly. Utilizing VIKANE in the process taught by this invention allows the quantity of VIKANE otherwise required in conventional structural fumigation to be significantly reduced, thereby offsetting the cost increase while maintaining effective fumigation results. Similar results are achieved with sulfur dioxide as the toxic agent.

Referring now to FIG. 1, a fumigation apparatus, generally designated as 100, for the practice of the invention is shown as utilized in a structural fumigation process. An enclosed space 106 containing a structure, such as a house (not shown) to be treated is formed under a tarpaulin 104. The tarpaulin 104 is conventional and may be of plastic or rubber impregnated material to form an essentially air tight barrier, thereby totally enclosing the space 106 to be treated.

A high pressure (typically 1,700 pounds per square inch and above) gas cylinder 102 having a pressure gauge and control valve mounted on it and containing the mixture of carbon dioxide and toxic gas therein at preselected proportions is mounted on a scale 101. The weight of the combined cylinder 102 and gas mixture therein is noted. An input hose 109 is connected the output control valve of the gas cylinder 102 and the input of a heat exchanger 103. A manifold or engine coolant heat exchanger commonly used in the fumigation industry may be used. The heat exchanger may raise the temperature of the fumigation gas to the range of from 70° F. to 250° F. An output hose 110 connects the output of the heat exchanger 103 to an outlet 111 mounted within the sealed tarpaulin 104. A flow meter 105 and temperature monitor 108 may be incorporated in the output hose 110 as safety devices to assure the flow and temperature of the fumigant are within acceptable ranges. The control valve of the gas cylinder 102 is opened and the scale 101 is monitored while the precalculated weight of fumigant gas is released into the enclosed space 106. A plurality of fans 107 may be placed within the enclosed space 106 to assist in dispersal of the fumigant gas.

FIG. 2 is another embodiment of the device, generally designated 200. Instead of mixing the carbon dioxide and toxic agent in a single tank, the carbon dioxide may be the only gas in one gas cylinder 102 and the toxic agent may be contained in another gas cylinder 213. Controlled flow meters 105 and 212 may be mounted at the output of each gas cylinder 102, 213 to control the flow of each gas a through a manifold 214 and the input hose 109 to the heat exchanger 103. The output hose 110 may contain the temperature monitor 108 and conducts the heated mix of carbon dioxide and toxic agent through the outlet 111 into the enclosed space 106 as above. The flow meters 105, 212 may be set to provide the mix of gasses recommended to achieve the fumigation effect desired.

Figure 3:
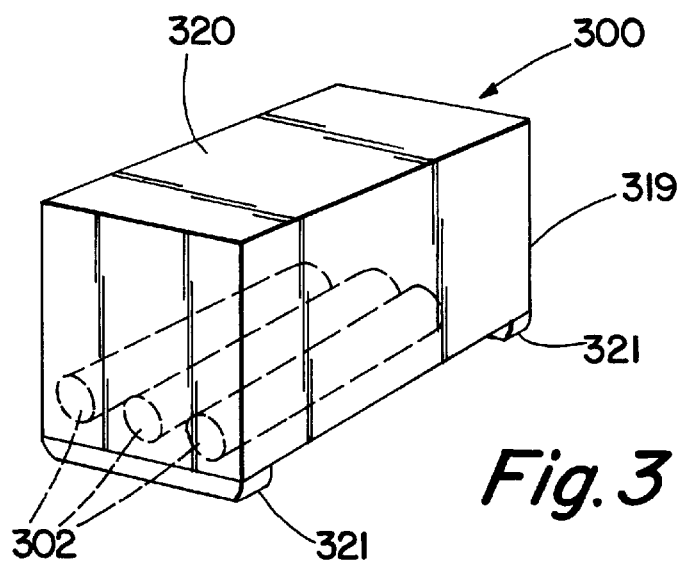
FIG. 3 is a perspective view of an embodiment of the invention for use with the embodiments illustrated in FIG. 1 and FIG. 2.

For general fumigation processes, especially for large scale application, or numerous applications during a day by a qualified fumigation person, a skid mounted embodiment may be provided. FIG. 3 is yet another embodiment of the invention, generally designated 300, which may be mounted on a skid and lifted onto a truck for transportation to the job site.

A plurality of gas cylinders 302 may be mounted within a closed container 320 having skids 321 on the bottom surface. The gas cylinders 302 may contain a mix of carbon dioxide and toxic agent as described for embodiment 100 above or each gas cylinder 302 may contain only one gas as described for embodiment 200 above. The number of gas cylinders 302 containing only one gas may be preselected to allow the mixing of carbon dioxide and toxic agent in the recommended proportions without exhausting one type of gas.

Figure 4:
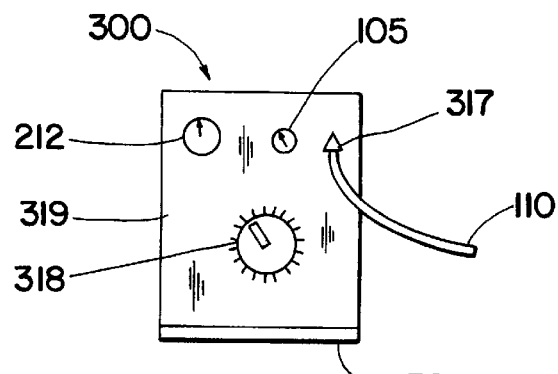
FIG. 4 is a rear elevational view of the device shown in FIG. 3.

A control panel 319, see FIG. 4, may be incorporated as one side of the closed container 320. The control panel may contain the connector for the input hose 110 which conducts the gas mixture from embodiment 300 to the heat exchanger 103 as described in embodiments 100 and 200.

The art of controlling gas flow, mixing gasses, and presetting the amount of gas to be mixed and discharged from the gas cylinders 302 within the closed container 320 is well known in the art. The control panel may contain a flow meter 105 for the carbon dioxide, a flow meter 212 for the toxic agent, and a flow controller 318 for setting the amount of mixed carbon dioxide and toxic agent to be discharged from embodiment 300.

Appropriate safety latches may be incorporated into the connector 317 of input hose 110 to prevent the discharge of gas from embodiment 300 unless the input hose 110 is attached.

Figure 5:
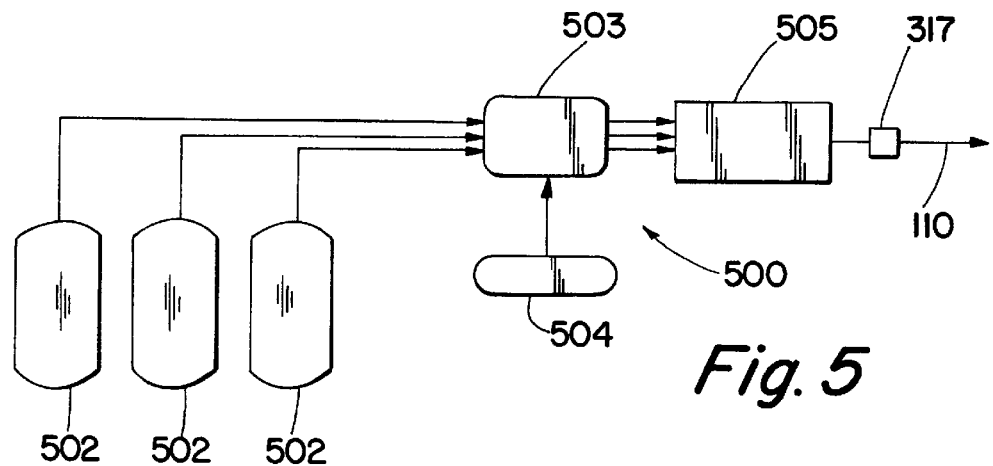
FIG. 5 is a schematic drawing of another embodiment of the invention as illustrated in FIG. 1 for use with the embodiment of FIG. 3.

FIG. 5 is an embodiment, generally designated 500, which may be incorporated into embodiment 300 of FIG. 3. A plurality of supply cylinders 502 are each connected to a controllable valve 503. A valve controller 504 is present to produce the preselected mix of gasses contained in the cylinders 502. The controllable valve 503 is connected to a mixer 505. The mixer 505 may be attached to the safety latch connector 317 to which the input hose 110 is attached.

While it is possible to apply the methyl bromide or other toxic agent by mixing the toxic agent directly with carbon dioxide under pressure in a high pressure cylinder of the type conventionally used to store carbon dioxide at a pressure of up to about 1700 psi, such premixing has a serious disadvantage if the entire cylinder contents are not used in a single fumigation application. Because of the differing physical characteristics of the toxic agent and carbon dioxide, the concentration of toxic agent with respect to carbon dioxide will change as the cylinder is being emptied. Consequently, for many applications, the advantages of the present invention may be lost by such premixing. In addition, the capacity of such high pressure cylinders is relatively limited, so that the quantity of such cylinders which must be transported to the fumigation site may be relatively large.

High pressure carbon dioxide cylinders may dispense carbon dioxide either as a liquid or as a gas, depending upon the particular delivery system embodied in the cylinder. If liquid carbon dioxide is dispensed, the pressure at which the carbon dioxide leaves the high pressure cylinder is so great as to make the use of the liquid carbon dioxide impractical for the present invention. The pressure cannot be reduced through the use of a pressure regulator, as the addition of a pressure regulator to the flow of liquid carbon dioxide from a high pressure cylinder is prohibited by current safety standards.

If gaseous carbon dioxide is dispensed from the cylinder, the use of a pressure regulator to reduce the pressure of the flow is required. However, the pressure regulator with either reduce the flow quantity to such a low value as to greatly prolong the fumigation process and preclude the realization of many of the advantages of present invention, or, with an increase in flow, the gaseous carbon dioxide may solidify as snow, making it impractical for use in the present invention.

Because of the above deficiencies in the use of high pressure cylinders as the source of the gaseous carbon dioxide mixed with the toxic agent to form the fumigant in the present invention, the presently preferred/embodiment of the invention, both in its apparatus and in its method aspects, utilizes liquid carbon dioxide stored in insulated containers, typically of the Dewar flask type, at an operating pressure currently typically between 100 and 350 psi, although pressures up to 500 psi can be used if the currently available storage reservoirs are modified accordingly. Maximum pressure is controlled by a conventional safety valve which vents gaseous carbon dioxide formed by evaporation of liquid carbon dioxide as it warms.

Figure 6:
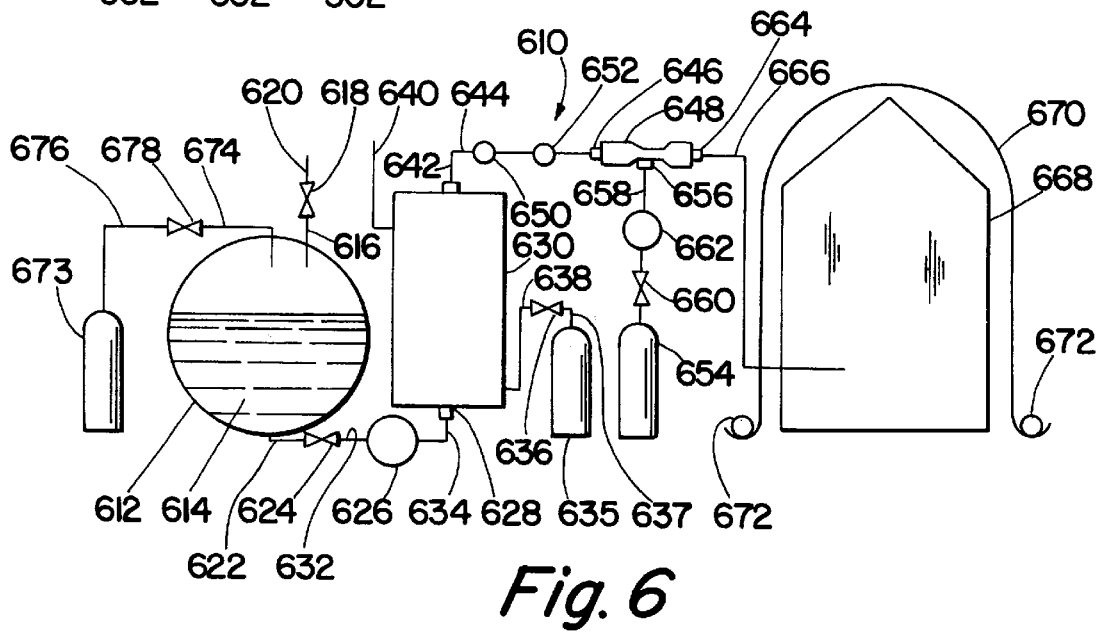
FIG. 6 is a schematic view of the presently preferred embodiment of the present invention utilizing liquid carbon dioxide contained at a relatively low pressure.

Referring now to FIG. 6, there is shown a schematic diagram of the presently preferred apparatus for performing the presently preferred method of the present invention. In FIG. 6, a fumigation system 610 has a Dewar or mini-bulk type storage vessel 612 within which is stored liquid carbon dioxide 614. It will be understood that the space within the storage vessel 612 above the liquid carbon dioxide 614 is filled with gaseous carbon dioxide. A gaseous carbon dioxide outlet pipe 616 connects the interior of the storage vessel 612 containing in the gaseous carbon dioxide to a safety valve 618 whose outlet 620 is the purpose of the safety The purpose of the safety valve 618 is to avoid an excess in pressure within the storage vessel 612 resulting from the continuous evaporation of the liquid carbon dioxide 614 into gaseous carbon dioxide, since the storage vessel 612 is not, in this embodiment, provided with an external source of coolant. However, the present invention is not limited to a storage vessel 612 which is not provided with external sources of coolant. Even in such an event, the safety valve 618 would be required in order to avoid the potential for overpressure within storage vessel 612 in the event of failure of the cooling system.

A liquid carbon dioxide outlet line 622 extends from within the interior of the storage vessel 612 at the lower portion thereof to a control valve 624, which is conventional in form. The control valve may be either manually or automatically operated, depending upon the particular control system utilized with the apparatus 610. A liquid carbon dioxide flow meter 626 is connected between the control valve 624 and an inlet 628 to a heater 630 by means of conduits 632, 634, respectively. When the control valve 624 is open, liquid carbon dioxide flows from the storage vessel 612 through the control valve 624, the flow meter 626, and a heater inlet 628 into a heater 630. The quantity of liquid carbon dioxide flowing through the flow meter 626 is recorded by the flow meter 626, which preferably is of the positive displacement type. Such flow meters are commercially available and, in the preferred embodiment described with respect to FIG. 6, should have the capability of recording the quantity of flow of liquid carbon dioxide at flow rate of from one to ten gallons per minute.

The heater 630 may use gas, oil, or an electrical source of heat, although for portable embodiments of the invention, a liquid petroleum gas fuel source is preferred. A container 635 contains liquid petroleum gas, and is connected to the heater 630 through a control valve 636 and associated gas lines 637, 638. A heater vent line 640 exhausts the products of the combustion of the liquid petroleum gas to the atmosphere. In the preferred embodiment, the heater 630 is a high pressure heater, which may be, for example, designed to heat water. For safety purposes, the heater should be capable of withstanding pressures in excess of 1500 psi.

The primary function of the heater 630 is to convert the liquid carbon dioxide applied to the heater inlet 628 into heated gaseous carbon dioxide by "flashing" the liquid phase carbon dioxide directly into the gaseous phase, without passing through the solid phase. Consequently, the heater 630 must have a sufficiently high heat output to maintain the temperature of the carbon dioxide as it passes from the liquid to the gaseous phase sufficiently high to avoid a pressure drop sufficient to cause the liquid carbon dioxide to be converted to the solid phase. Therefore, the heater 630 should convert the liquid carbon dioxide directly into gaseous carbon dioxide to provide a gaseous carbon dioxide flow having a temperature preferably of at least 120° F., and above about 70° F. at a minimum to provide satisfactory expansion.

The heater 630 has an outlet 642 to which an outlet line 644 is connected at one end. The temperature of the flow at the heater outlet 642 should exceed ambient temperature under normal operating conditions. The other end of the outlet line 644 is connected to an inlet 646 of a mixer 648. Disposed in the outlet line 644 between the heater outlet 642 and the mixer inlet 646 are a temperature gauge 650 and a pressure gauge 652, for use in monitoring the temperature and pressure of the gaseous carbon dioxide output of the heater 630. The control valves 624 and 636 are utilized to ensure that the temperature of the gaseous carbon dioxide output of the heater is within the desired parameters. In order to ensure that the liquid carbon dioxide is flashed to gaseous carbon dioxide and provide a sufficient flow rate of the gaseous carbon dioxide for fumigation purposes, typically the heated gaseous carbon dioxide monitored by the meters 650, 652 will be within a temperature range of between 70° F. and 250° F. and at a pressure less than the pressure within the storage vessel 612.

A toxic agent container 654 contains a toxic agent, methyl bromide in the presently preferred embodiment, which is to be mixed with the flow of heated gaseous carbon dioxide. Typically, the toxic agent will be under pressure, although normally at a comparatively low pressure, such as 150 psi, as compared to the pressure within the storage vessel 612, which typically is between 150 psi and 350 psi. Of course, the upper limit of the pressure within the storage valve is controlled by the setting of the safety valve 618. Pressures as high as 500 psi may be utilized, if desired, although the presently preferred maximum pressure is 350 psi.

The mixer 648 has a toxic agent inlet 656 which is connected to the toxic agent containers 654 through a toxic agent inlet line 658, which includes a toxic agent flow control valve 660 and toxic agent flow meter 662. The toxic agent flow meter 662 is preferably of the positive displacement type, so as to record the total quantity of toxic agent which is applied to the toxic agent inlet 656. The mixer 648 has a mixer outlet 664 to which a fumigant outlet line 666 is connected. The fumigant outlet line 666 is an open conduit which extends into a structure or space 668 to be fumigated, for example, a house (not shown) to be fumigated for termites.

A tarpaulin or its equivalent 670 encloses the structure 668 so as to prevent the passage of air from outside the tarpaulin 670 into the structure 668. In the particular application diagrammatically illustrated in FIG. 6, the tarpaulin 670 is held on a supporting surface (not shown) by weights 672 in conventional fashion. As is diagrammatically illustrated, the tarpaulin 670 has ballooned away from the structure 668, by reason of the pressure of the carbon dioxide which has passed through the mixer 648 and the fumigant outlet line 666 into the interior of the structure 668. The structure 668 has air leakage normally inherently built into the structure, so that as the carbon dioxide containing fumigant mixes with the air in the structure, so as to displace a portion of the air from the structure and through leakage in the tarpaulin 670, the displaced air passes into the atmosphere. However, the tarpaulin 670 is sufficiently gas-tight so that it balloons out from the increased pressure within the structure resulting from the application of the fumigant mixture containing gaseous carbon dioxide.

As was noted above, in the process aspects of the preferred embodiment, gaseous carbon dioxide which has passed from the heater outlet 642 and is applied to the mixer inlet 646 is at a higher pressure than the pressure of the toxic agent within the container 654. In the preferred embodiment, the toxic agent within the container 654 is mixed with the flow of gaseous carbon dioxide in the mixer so that the mixture of gaseous carbon dioxide and toxic agent is applied to the structure 668. In order to ensure efficient mixing of a sufficient quantity of toxic agent with the gaseous carbon dioxide, in the preferred embodiment the pressure of the carbon dioxide flowing through the mixer 648 is temporarily reduced during its transit through the mixer 648 by the use of a Venturi or similar arrangement. The toxic agent inlet 656 is located downstream from the carbon dioxide inlet 646 at a point where, by reason of the pressure reduction accomplished temporarily in the flow of the gaseous carbon dioxide through the mixer 648, with, of course, an increase in velocity of gaseous carbon dioxide, the pressure of the toxic agent is in excess of the pressure of the gaseous carbon dioxide flow, so that the toxic agent flows into the stream of gaseous carbon dioxide. While in the preferred embodiment, the reduction in pressure of the carbon dioxide flow is only temporary, the mixer 648 can be configured, of course, to provide a permanent reduction in the pressure of the carbon dioxide flow, although such a permanent reduction is not presently preferred when a tarpaulin or other temporary sealing element is used, by reason of the potential loss of fumigation efficiency resulting from loss of the "ballooning" effect of the tarpaulin 670.

Normally, the rate of withdrawal of liquid carbon dioxide from the storage vessel 612, which results in a decrease in the pressure of the gaseous carbon dioxide in the storage vessel 612, is compensated for by the continuing increase in pressure of gaseous carbon dioxide resulting from evaporation of the liquid carbon dioxide by reason of absorption of heat from outside the storage vessel 612. By reason of the size of the storage vessel 612, or other factors, the withdrawal of the liquid carbon dioxide could result in a sufficiently large decrease in pressure of the gaseous carbon dioxide to approach the pressure which, for the temperature of the liquid carbon dioxide, the liquid carbon dioxide may convert into solid carbon dioxide. To avoid this conversion, a high pressure cylinder 673, filled with carbon dioxide, typically at a pressure in excess of 1500 psi, is connected to a storage vessel gas inlet 674 by a high pressure gas line 676. A control valve 678 controls the flow of high pressure gas from the cylinder 673 to the inlet 674. The control valve 678 may be either manually operated, or automatically operated at such time as the pressure of the gaseous carbon dioxide within the storage vessel 612 drops below a pre-selected pressure to increase the pressure within the storage vessel 612 to avoid conversion to solid carbon dioxide.

Typically, in the operation of the apparatus 610 shown in FIG. 6, the ratios of carbon dioxide and toxic agent described heretofore with respect to the embodiments of FIGS. 1 and 2 are utilized to achieve a carbon dioxide concentration of about 10% in the fumigant —air mixture after filling the structure, and a flow rate of from one to ten gallons per minute of liquid carbon dioxide is utilized to provide a short fill time. The total weight of carbon dioxide required by the volume of the structure to be fumigated is determined, the presently preferred amount being eleven pounds per thousand cubic feet to provide the 10% concentration of carbon dioxide. The flow of carbon dioxide through the control valve 624 is terminated after the flow meter 626 indicates that the desired quantity of carbon dioxide has been applied to the heater 630. During the process of the flashing of the liquid carbon dioxide in the heater 630, the toxic agent control valve 660 is opened, and toxic agent from the toxic agent storage cylinder 654 flows into the mixer inlet 656 through the toxic agent flow meter 662. At such time as the desired amount of toxic agent has passed through the toxic agent flow meter 662, the toxic agent flow control valve 660 is closed, terminating the flow of the toxic agent. The flow of carbon dioxide is then terminated either contemporaneously or at such subsequent time as the desired amount of carbon dioxide has been flashed and flowed into the space 668. While it is possible to flow the toxic agent into the space 668 and then commence the flow of carbon dioxide to complete the fumigant mixture, such a practice is not presently preferred in the process aspects of the invention.

By the practice of the present invention, the efficient eradication of the target pest can be accomplished even though the weight of toxic agent required is reduced by at least one-half and, in certain instances, three-fourths or more. In the practice of the present invention, the presently preferred dosage range by weight of toxic agent for structural fumigation is from one-third to one-fourth the weight of toxic agent conventionally used. The practice of the present invention thus permits the weight of toxic agent required for eradication of the target pest to be reduced to less than one-half of that which was required to be used heretofore, while still effecting the required eradication of the target pest.

Complete eradication of the target pest has been achieved with these reduced toxic agent concentrations in as little as five hours after completion of fill, as compared to the in excess of 24 hours exposure time required by conventional practice. The use of the heated carbon dioxide has been found to increase the toxic effect provided by the toxic agent over and above the toxicity provided by either carbon dioxide or the toxic agent alone. In other words, the combination of heated carbon dioxide and methyl bromide produces a synergistic effect as to toxicity, and as to penetration of the fumigant as well, while greatly reducing the quantity of toxic agent required and thus greatly reducing the health risk to those involved in the structural fumigation operation or the subsequent use of the fumigated structure.

The terms "structure" and "structural," as used herein with reference to fumigation processes, refer to fumigation of an enclosed volume, the major portion of which is air, as distinguished from a commodity fumigation process, in which a substantial portion of the volume being fumigated consists of solid materials, grains or nuts, for example. However, the use of the terms "structure" and "structural" herein includes fumigation processes in which the fumigation of such solid materials may be inherently accomplished in the fumigation of the enclosed volume, such as fumigation of grain temporarily stored prior to use in a flour mill being fumigated or flour temporarily stored prior to use in a bakery being fumigated, as distinguished from a grain-filled storage silo, for example.

The invention claimed is:

1. In a process for fumigating a structure, the steps of:
providing a reservoir of a non-flammable cryogenic liquid;
continuously maintaining said cryogenic liquid at a pressure of less than 500 pounds per square inch;

providing a flow of cryogenic liquid from said reservoir;

heating said flow of cryogenic liquid to a temperature such that the cryogenic liquid flashes directly into its gaseous state to provide a flow of heated non-flammable gas without said liquid passing through its solid phase;

applying the flowing mixture of heated gas to a structure to be fumigated;

providing a source of a toxic agent;

providing a flow of said toxic agent from said source; and mixing the toxic agent with the flow of heated gas to produce a fumigant by introducing the toxic agent into the flow of heated gas before the heated gas enters the structure.

2. The process of claim 1, and in which the flow of toxic agent is at a first pressure which is less than the pressure of the flow of the heated gas, and including the step of reducing the pressure of the flow of heated gas to a second pressure which is less than said first pressure prior to mixing said toxic agent with said heated gas flow.

3. The process of claim 2, and in which the cryogenic liquid is liquid carbon dioxide.

4. The process of claim 3, and in which the flow of gaseous carbon dioxide is at a pressure in excess of 100 psi prior to being mixed with the toxic agent.

5. The process in any one of claims 3 or 4, and in which the toxic agent is methyl bromide and the fumigant within the structure is comprised of a mixture of methyl bromide and carbon dioxide in a ratio of from 8 ounces to 2 pounds of methyl bromide per 1000 cubic feet of structural volume and at least eight pounds of carbon dioxide per 1000 cubic feet of structural volume.

6. The process of claim 5, and in which the reservoir of liquid carbon dioxide is maintained at a pressure in excess of 100 pounds per square inch, and in which the temperature of the gaseous carbon dioxide prior to application to the structure is in excess of 70° F.

7. The process of claim 5, and which the liquid carbon dioxide is maintained at a pressure of between 150 and 300 pounds per square inch for substantially all of the period during which the liquid carbon dioxide is being flashed to gaseous carbon dioxide, and which the temperature of the carbon dioxide after flashing is in excess of 120° F.

8. Apparatus for producing a gaseous fumigant for use as a structural fumigant comprising:

first storage means for storing carbon dioxide in a liquid phase at a first pressure which is always less than 500 pounds per square inch;

second storage means for storing a toxic agent at a second pressure;

a heater having an inlet and an outlet and operable to flash liquid phase carbon dioxide applied to said inlet directly into gaseous carbon dioxide;

fluid passage means connected between said first storage means and said heater and selectively operable to apply a selectable quantity of said liquid carbon dioxide to the heater inlet as a liquid;

mixing means having an outlet, a first mixer inlet for receiving the heated gaseous carbon dioxide from said heater and a second mixer inlet located downstream from said first inlet for receiving toxic agent from said second storage means, said mixing means being operable to mix said heated gaseous carbon dioxide from said heater and said toxic agent when applied to said second inlet to form a heated gaseous mixture thereof and to apply said heated gaseous mixture to said mixing means outlet;

second fluid transfer means comprised by fluid conduit open along its length and operable to transfer the gaseous carbon dioxide passing from said heater outlet to said mixing means first inlet;

third fluid transfer means selectively operable to transfer a selectable quantity of said toxic agent from said second storage means to said mixing means second inlet; and fumigant transfer means comprising a fluid conduit open along its length and having an inlet connected to said mixing means outlet and an outlet remote therefrom and operable to transfer the heated gaseous mixture passing from said mixing means outlet to the fumigant transfer means outlet.

9. Apparatus according to claim 8, and including means selectively operable to add gaseous carbon dioxide to said storage means to reduce a pressure drop within said storage means resulting from withdrawal therefrom of liquid carbon dioxide.

10. Apparatus according to claim 8, and in which the heater is operable to flash the liquid carbon dioxide into gaseous carbon dioxide which leaves the heater outlet at a temperature in excess of 120° F.

11. Apparatus according to either claim 9 or claim 10, and in which the heater is operable to flash the liquid carbon dioxide into gaseous carbon dioxide which leaves the heater outlet of a pressure in excess of 100 pounds per square inch.

12. Apparatus according to claim 11 and in which the second pressure is less than the pressure of the heated gaseous carbon dioxide as it leaves the heater outlet, and in which said mixing means includes means operable to reduce the pressure of the heated gaseous carbon dioxide as it is being mixed with the toxic agent to a pressure less than said second pressure.

* * * * *